United States Patent
Nakao et al.

(10) Patent No.: US 7,703,396 B2
(45) Date of Patent: Apr. 27, 2010

(54) CARRIAGE SYSTEM

(75) Inventors: Takashi Nakao, Neyagawa (JP); Yoichi Nakamura, Nagaokakyo (JP); Akihiko Ishiura, Kyoto (JP)

(73) Assignee: Murata Kikai Kabushiki Kaisha, Tokyo (JP)

( * ) Notice: Subject to any disclaimer, the term of this patent is extended or adjusted under 35 U.S.C. 154(b) by 524 days.

(21) Appl. No.: 11/183,841

(22) Filed: Jul. 19, 2005

(65) Prior Publication Data

US 2006/0016363 A1   Jan. 26, 2006

(30) Foreign Application Priority Data

Jul. 22, 2004   (JP)   ............... 2004-214132

(51) Int. Cl.
*B61B 3/00* (2006.01)
(52) U.S. Cl. ............................................. 104/89
(58) Field of Classification Search ............... 104/281, 104/284, 88.01, 88.02, 88.04, 89, 95; 198/502.1, 198/502.4, 618
See application file for complete search history.

(56) References Cited

U.S. PATENT DOCUMENTS 5,138,560 A * 8/1992 Lanfer et al. ............... 235/454

2004/0089190 A1 * 5/2004 Ramu et al. ................. 104/281

FOREIGN PATENT DOCUMENTS

| JP | 08-202448 A | 8/1996 |
| JP | 8-292813 | 11/1996 |
| JP | 08-292813 | * 11/1996 |
| JP | 09-198143 A | 7/1997 |
| JP | 09-297621 A | 11/1997 |
| JP | 2004-078785 A | 3/2004 |

OTHER PUBLICATIONS

Notification of Reason(s) for Refusal dated Apr. 8, 2008 issued in corresponding Application No. 2004-214132.

* cited by examiner

*Primary Examiner*—S. Joseph Morano
*Assistant Examiner*—Robert J McCarry, Jr.
(74) *Attorney, Agent, or Firm*—Westerman, Hattori, Daniels & Adrian, LLP

(57) ABSTRACT

In a curve section, a comb tooth mark 28 is provided concentrically with a center line 44 of a running rail 4. A comb tooth sensor 34 on an overhead running vehicle 2 reads comb teeth 40. Then, corrections are made using the ratio of the radius of curvature (R) of the center line 44 and the radius of curvature (r) of the comb tooth mark 28. An encoder interpolates the areas between the teeth 40. Then, the position of the overhead running vehicle 2 in the curve section is determined. The present invention thus enables the exact position of the overhead running vehicle 2 to be recognized even when the overhead running vehicle 2 is located in a curve section. This makes it possible to provide a load port in a curve section.

5 Claims, 6 Drawing Sheets

CARRIAGE SYSTEM

FIELD OF THE INVENTION

The present invention relates to a system for a carriage such as a guided carriage, for example, an overhead running vehicle or an automated guided vehicle running autonomously without using any tracks, and in particular, to running control in a curve section.

BACKGROUND OF THE INVENTION

The inventor has examined how to precisely recognize the position of a carriage in a curve section. Successful precise recognition, for example, enables the recognition of the position of the carriage in all the sections of a running route from a start point to a destination. As a result, the carriage can reach the destination in an intended running time without unwanted acceleration or deceleration. A reduction in the need for acceleration or deceleration enables the minimization of vibration to which articles may be subjected during conveyance.

The inventor has further examined how to precisely recognize the position of the carriage in a curve section to enable the carriage to be stopped at a predetermined position even in the curve section, thus allowing a station to be provided in the curve section. If this is successful, restrictions on the installation of stations can be reduced to allow a carriage system to be flexibly laid out.

In connection with the recognition of the position of a guided carriage in a curve section, the Unexamined Japanese Patent Application Publication (Tokkai-Hei) No. 8-292813 discloses a technique for correcting an output from an encoder for the curve section so as to vary a determined running distance between a curve section and a rectilinear section even if the output is the same for both sections. However, such positional recognition is an approximate technique and is not suitable for the recognition of the exact position in the curve section.

SUMMARY OF THE INVENTION

It is an object of the present invention to enable the position of a carriage to be determined using an external sensor even when the carriage is located in a curve section. It is an additional object of the present invention set forth in claim 2 to enable the position of the carriage in the curve section to be more precisely determined. It is an additional object of the present invention set forth in claim 3 to enable a stop point to be provided even in the curve section.

The present invention provides a carriage system in which a mark is provided on a right side or a left side of a center line of a running route so that a mark detecting sensor on the carriage can read the mark to recognize a position of the carriage, the carriage system being characterized in that the mark is provided at least in a curve section, and the carriage is provided with means for detecting the curve section so that when the means detects the curve section, the carriage determines a running distance of the carriage in the curve section on the basis of the mark to recognize the position of the carriage.

Preferably, the mark is a comb tooth mark which is provided concentrically with the center line of the running route in the curve section, and the carriage uses a ratio of a radius of curvature of the center line of the running route to a radius of curvature of the comb tooth mark to correct the distance determined on the basis of the comb tooth mark, to determine the running distance of the carriage in the curve section.

Particularly preferably, a stop point is provided in the curve section, and an encoder provided in a running system of the carriage interpolates the corrected positions determined on the basis of the comb tooth mark, to determine the position of the carriage, the carriage being stopped at the stop point.

According to the present invention, upon detecting a curve section, the carriage uses the mark provided on the right side or the left side of the center line of the running route to determine the running distance of the carriage in the curve section. The carriage thus recognizes its own position. To detect a curve section, it is possible to provide an index indicating a curve section at an entry of the curve section, while providing the carriage with a sensor for detecting the index, or to use map information on the carriage and the running distance determined using the encoder.

When the mark is the comb tooth mark, the comb teeth can be detected at a predetermined pitch within the curve section. However, the distance determined on the basis of the comb teeth is not correct because the comb teeth are not located on the center line of the running route but on the right side or the left side of the center line. Thus, the comb tooth mark is placed concentrically with the center line of the running route. The running distance determined on the basis of the comb tooth mark is then corrected using the ratio of the radius of curvature of the center line of the running route to the radius of curvature of the comb tooth mark in the curve, the radii of curvature being determined with respect to the center of curvature. This makes it possible to precisely recognize the position of the carriage in the curve section. If the curve section is an S-shaped curve or the like, there are a plurality of centers of curvature in one curve section. Further, the radii of curvature need not be fixed. It is only necessary that the center line of the running route and the comb tooth mark be concentric and that corrections be made using the fixed or variable ratio of the radii of curvature.

With the comb tooth mark, it is difficult to recognize the areas between the teeth. Thus, the areas between the teeth are interpolated using the encoder provided in the running system of the carriage. This makes it possible to almost continuously determine the position of the carriage in a curve section. Thus, the stop point may be provided in the curve section to allow the carriage to be stopped at a predetermined accuracy. This reduces restrictions on the installation of the stop point such as a load port, thus providing a more efficient carriage system.

DETAILED DESCRIPTION OF THE PREFERRED EMBODIMENTS

The best embodiment for carrying out the present invention will be shown below.

Figure 1:
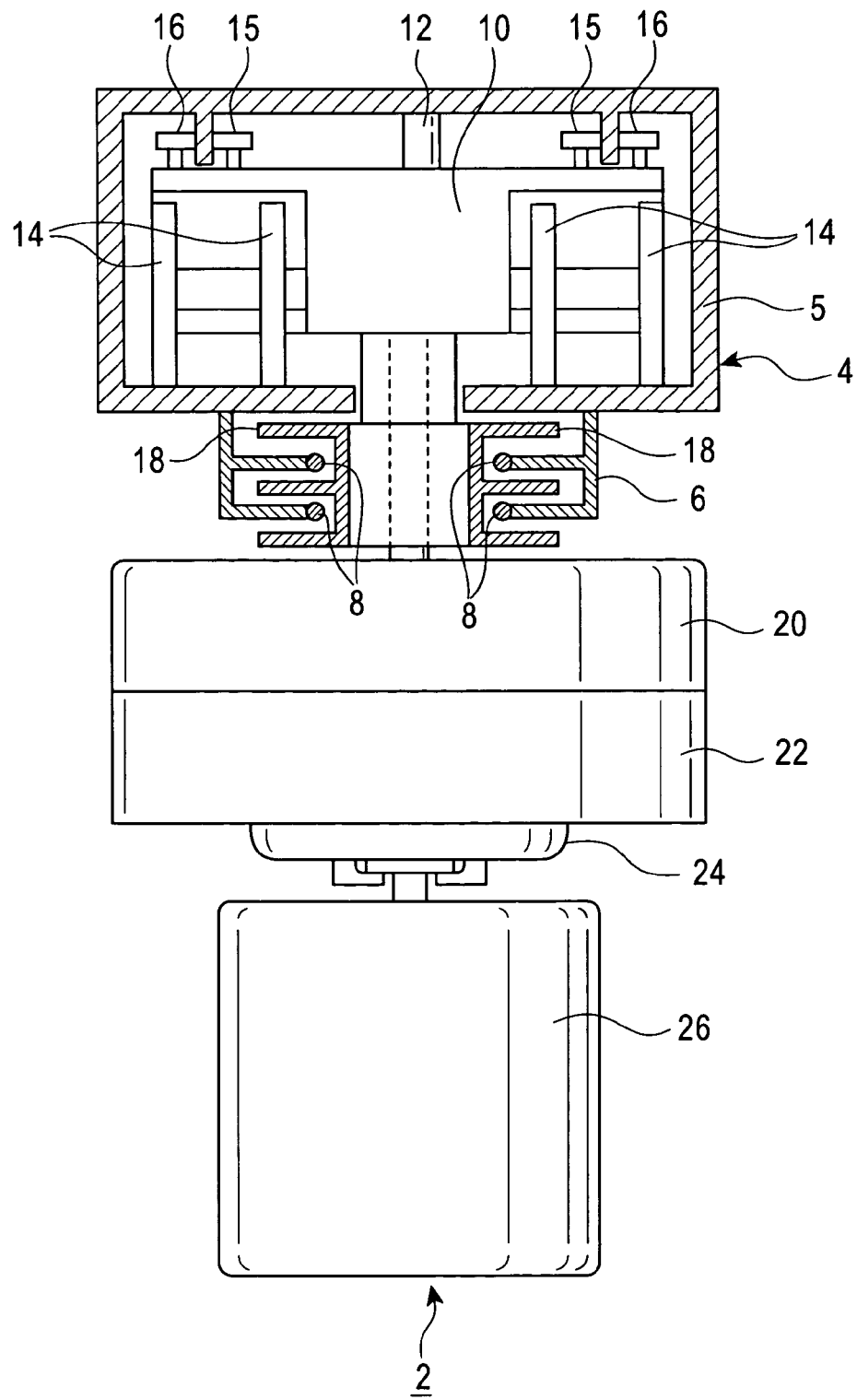
FIG. 1 is a sectional view of an essential part of a carriage used in an embodiment.

FIGS. 1 to 7 shows the embodiment and its variations. FIG. 1 shows the structure of an overhead running vehicle 2. 4 is a running rail supported on, for example, a ceiling of a clean room and composed of a running rail main body 5 and an electricity feeding rail 6. The electricity feeding rail 6 is provided with a Litz wire 8 to supply power to the overhead running vehicle 2 in a non-contact manner. The carriage may be a guided carriage running on the ground or an automated guided vehicle autonomously running without using any tracks. The running rail 4 is composed of an extrusion material of aluminum, and has rectilinear sections each divided into units each with a predetermined length. The curvature in a curve section is fixed throughout the carriage system or about two or three predetermined curvatures are used throughout the carriage system. Throughout the carriage system, a change in running direction in a curve section corresponds to one of about one to three angles, for example, 90 degrees or 60 degrees.

10 is a running driving section of the overhead running vehicle 2 which comprises a driving wheel 12, running wheels 14, and the like. 15, 16 are guide rollers that control the rectilinear movement and branching of the overhead running vehicle 2. 18 is a pickup that receives non-contact power supply from the Litz wire 8. 20 is a lateral feeding section that feeds an elevate and lower driving section 22 and a platform 24 in a lateral direction with respect to the running rail 4. The elevate and lower driving section 22 elevates and lowers the platform 24, and chucks an article 26 such as a cassette using the platform 24.

Figure 2:
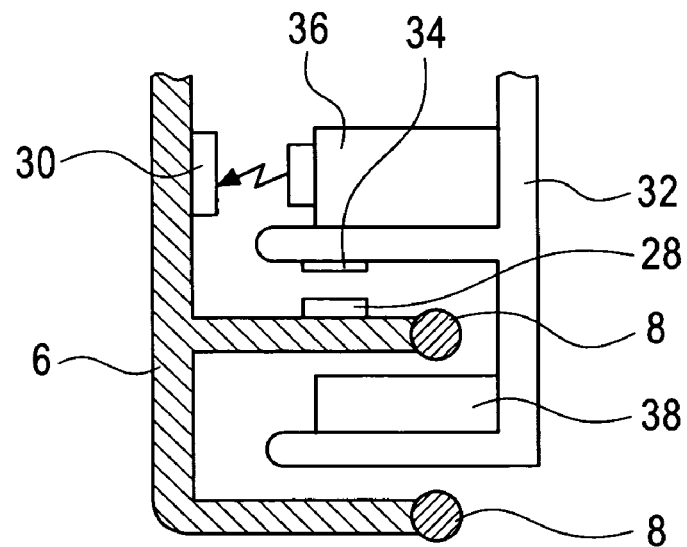
FIG. 2 is a diagram showing an arrangement with which the carriage reads an ID and a comb tooth mark on a running rail.

FIG. 2 shows how a comb tooth mark 28 and the like are attached to the electricity feeding rail 6. 30 is an ID composed of an optically or magnetically readable mark. The ID describes, for example, its own number N1, the number N2 of a station located in a curve section, the radius of curvature (R) of the center line of the running rail in the curve section, the radius of curvature (r) of the comb tooth mark 28, the coordinates P1 of the start position of the comb tooth mark 28 in the curve section, and the coordinates P2 of the station. The contents of the description in the ID 30 may be varied. If for example, the radii of curvature (R) and (r) in a curve section are fixed throughout the layout, they may be stored in a map for the layout of the overhead running vehicle 2 instead of being described in the ID 30. The number N2 and coordinates P2 of the station are unnecessary provided that there is no station in the curve section. It is also possible to describe the coordinates of the ID 30 itself instead of the coordinates P1 of the start position of the comb tooth mark 28. However, this requires the ID 30 itself to be accurately attached, but the description of the coordinates P1 of the start position of the comb tooth mark 28 eliminates the need to attach the ID 30 itself to an accurate position. The ID 30 is provided at a position where special data is required to control the running of the overhead running vehicle 2. Specifically, the ID 30 is installed in front of the curve, at the start position of the curve section, in front of the station, in front of a branching and joining portion, or at an exit.

In the overhead running vehicle 2 side, sensor units 32 are provided, for example, in front of and behind the pickup 18 and on the opposite sides of the vehicle body in a lateral direction. A comb tooth sensor 34 reads the comb tooth mark 28 and an ID reader 36 reads the ID 30. Further, non-contact communication unit 38 communicates with a controller (not shown in the drawings) via the Litz wire 8 or the like. If an alternating current of for example, about 10 kHz is passed through the Litz wire 8, this frequency can be distinguished from that used for communications when the latter frequency is higher than that of the alternating current by a factor of for example, 10 to 100.

Figure 3:
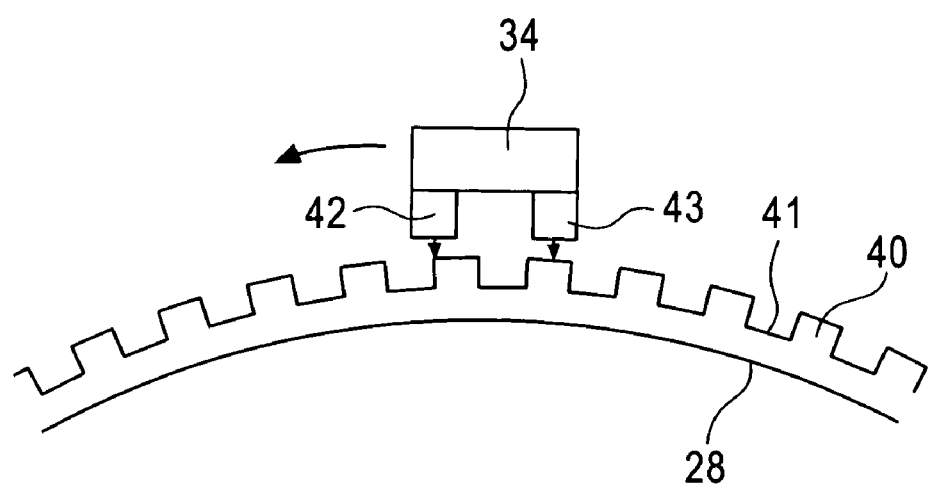
FIG. 3 is a diagram showing how to read the comb tooth mark according to the embodiment.

FIG. 3 shows how to read the comb tooth mark 28. For example, teeth 40 and grooves 41 are formed in the comb tooth mark 28 so as to have the same width. The teeth 40 and grooves 41 appear, for example, at a fixed pitch (about 1 to 5 cm). A pair of optical sensors 42, 43 is placed on the comb tooth sensor 34 so that the pitch between the optical sensors is equal to 5/4 pitches of the teeth 40. This makes it possible to recognize the position of the overhead running vehicle 2 at intervals each equal to a ¼ pitch of the teeth 40. Further, the pair of optical sensors 42, 43 enables the running direction of the overhead traveling vehicle 2 to be recognized using the phases of signals from the optical sensors 42, 43. The comb tooth mark 28, composed of the teeth 40 and grooves 41, is formed by punching or etching a metal plate. However, instead of the metal plate, for example, a color tape may be used to form a comb tooth mark 28 so that transparent areas and colored, opaque areas appear at predetermined intervals. Moreover, the type of the comb tooth sensor 34 is arbitrary. For example, magnetic sensors may be used in place of the optical sensors 42, 43.

Figure 4:
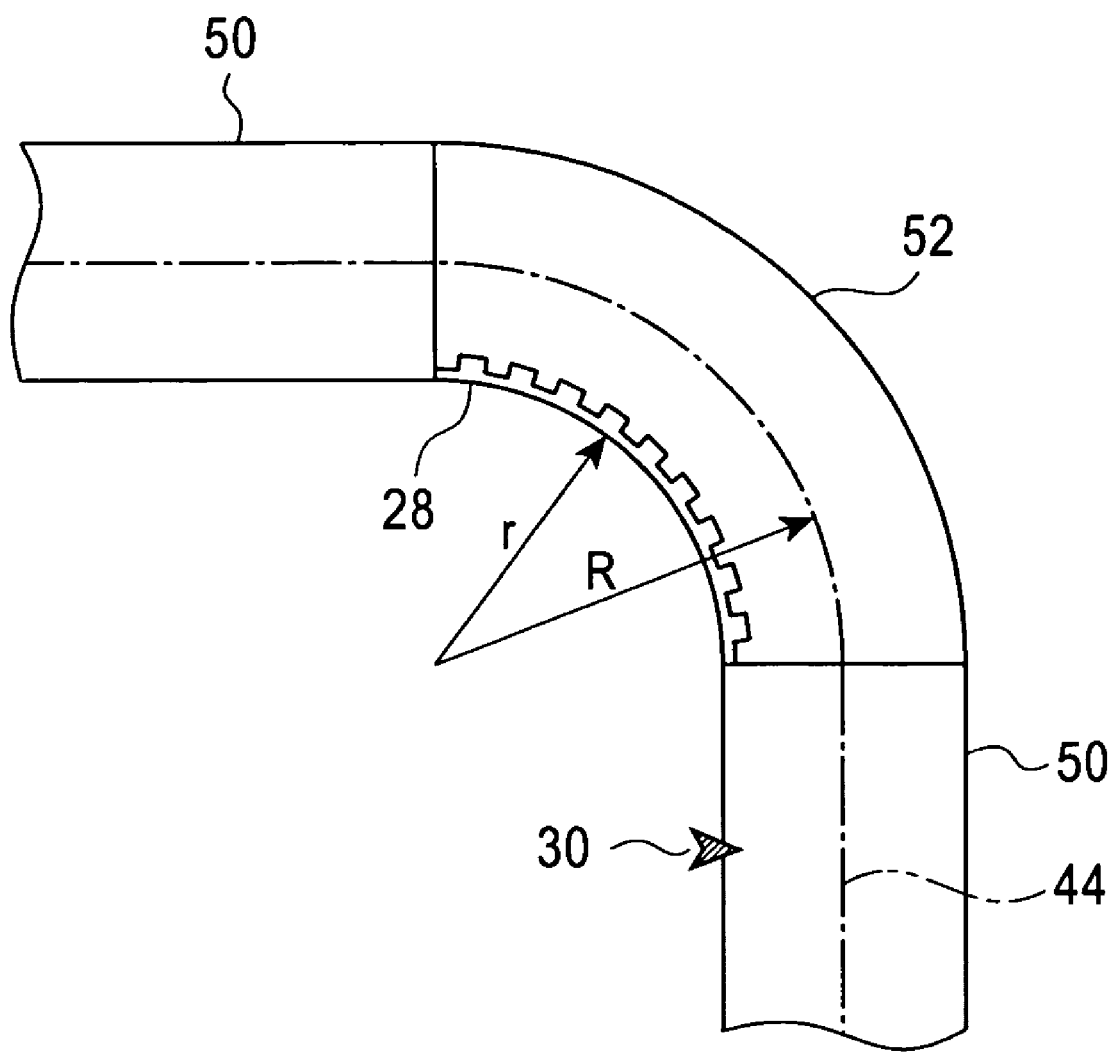
FIG. 4 is a diagram schematically showing how the comb tooth mark is installed in a curve section according to the embodiment.

FIG. 4 shows the arrangement of the comb tooth mark 28 in a curve section. 44 is the center line of the running rail 4, which has the radius of curvature (R). The comb tooth mark 28 has the radius of curvature (r). The comb tooth mark 28 is placed only in curve sections. In this case, the comb tooth mark 28 is placed in the inner periphery of the running rail 4, but may be placed in the outer periphery. As is apparent from FIG. 1, the center line 44 of the running rail 4 has a hole or the like through which a shaft that supports the driving wheel 12 and lateral feeding section 20 is passed. The comb tooth mark 28 cannot be provided in this part. This applies not only to the overhead running vehicle 2 but also to a guided carriage running on the ground.

The running rail 4 is composed of a combination of a rectilinear unit 50 and a curve unit 52. The curve unit 52 changes the running direction of the overhead running vehicle 2 by for example, 90 degrees. The radii of curvature (R), (r) in a curve are fixed throughout the layout. A change in running direction in a curve section corresponds to a fixed angle throughout the layout. In this case, the radii of curvature (R), (r) may be omitted from the data in the ID 30. The comb tooth mark 28 is placed only in the curve unit 52. The comb tooth unit 28 starts at the same time when the curve section starts. The comb mark 28 ends when the curve section ends.

The overhead running vehicle 2 reads the ID 30 of the curve unit 52 to recognize that the curve section is to start. Then, when the first tooth of the comb tooth mark 28 is detected, the overhead running vehicle 2 recognizes its own present position on the basis of the data P1 in the ID 30. Subsequently, every time a tooth of the comb tooth mark 28 is detected, the overhead running vehicle 2 adds the product of the pitch of the comb teeth and R/r to the value for the position to determine its own position in the curve section. The areas between the comb teeth are interpolated using a signal from an encoder attached to the driving wheel 12 or any of the running wheels 14, to determine the present position of the overhead running vehicle 2. For curve sections, the signal from the encoder is likely to contain an error. However, this signal is used only to interpolate the areas between the teeth of the comb tooth mark 28, so that the signal from the encoder may be or may not be subjected to corrections based on the location of the overhead running vehicle 2 in the curves section.

Figure 5:
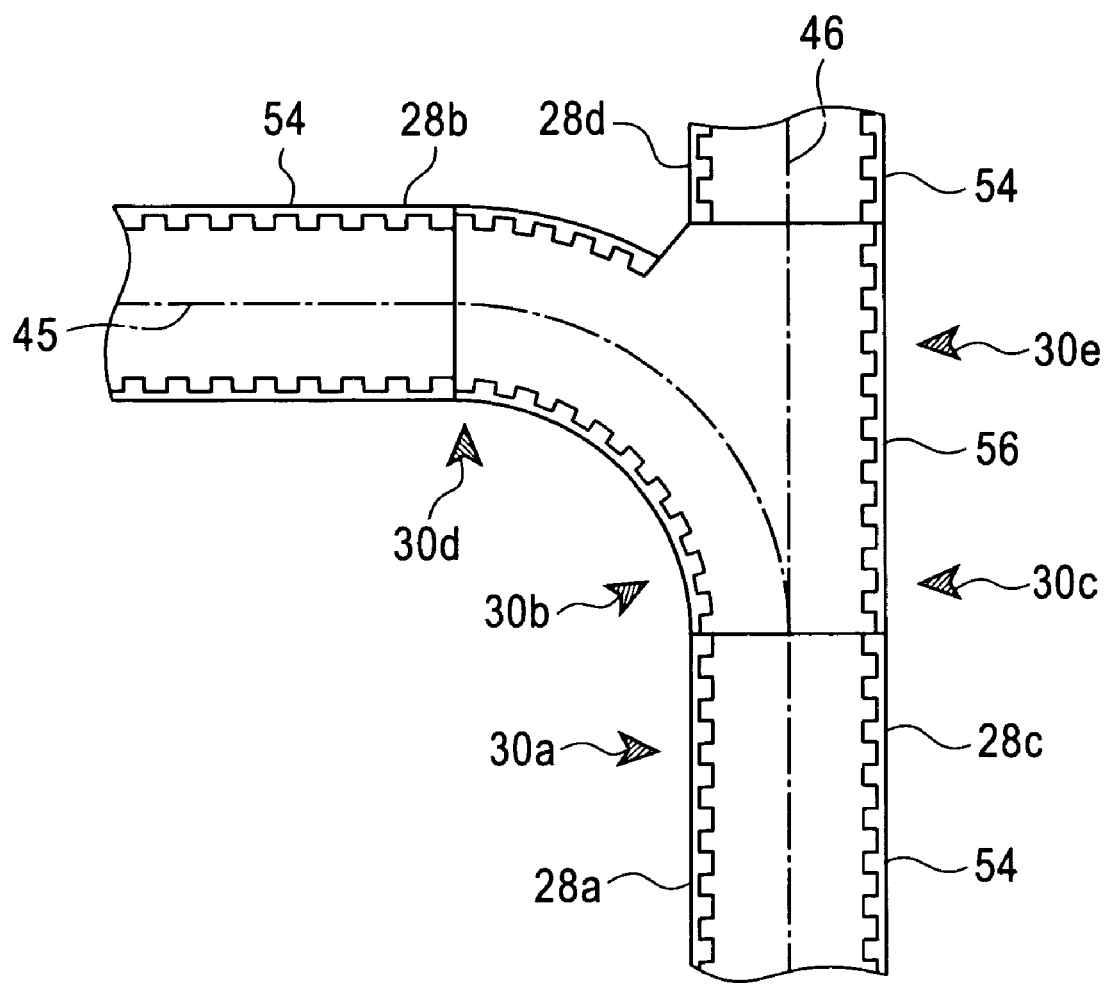
FIG. 5 is a diagram schematically showing how to install the comb tooth mark on the opposite sides of the running rail in all sections according to the embodiment.

FIG. 5 shows a variation in which the comb tooth marks 28*a* to 28*d* are provided all over the length of the running route on both right and left sides of the route. 45, 46 are the center lines of the running route. An ID 30*a* indicates that branching is to be started. An ID 30*b* indicates that the overhead running vehicle 2 is running along a branching route side. An ID 30*c* indicates that the overhead running vehicle 2 is running along a rectilinear route side. IDs 30*d*, 30*e* indicate that the overhead running vehicle 2 has exited the branching portion. 54 is a rectilinear unit of the running rail 4. 56 is a branching unit. The branching unit 56 may be constructed by merging a rectilinear unit and a branching unit.

In the variation shown in FIG. 5, the comb tooth marks 28*a* to 28*d* are provided on the laterally opposite sides in both branching side and rectilinear side. Since the overhead running vehicle 2 has sensor units on its laterally opposite sides, it can recognize its own present position not only in rectilinear portions but also at arbitrary positions such as branching portions and curve sections. In the variation shown in FIG. 5, the branching side is a curve section in which the overhead running vehicle 2 recognizes its own present position on the basis of the ratio of the radius of curvature of the running rail center line 45 to the radius of curvature of the comb tooth mark 28*a* as in the case of FIG. 4.

Figure 6:
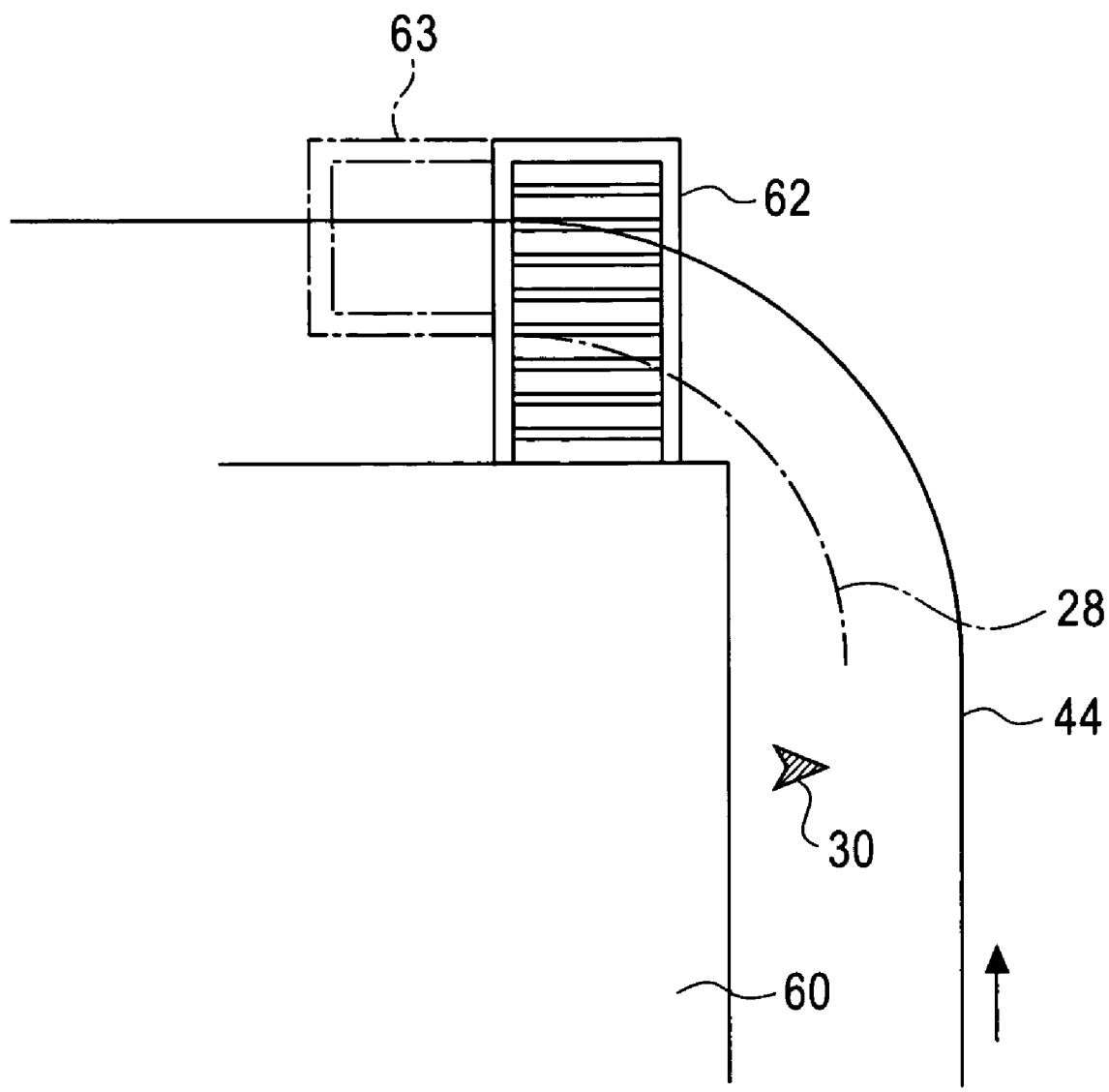
FIG. 6 is a diagram showing how to install a load port in a curve section according to the embodiment.

FIG. 6 shows an example in which a load port 62 of a processing device 60 is provided in a curve section. The load port 62 is an example of a stop point. Alternatively, a stop point may be provided in order to allow the overhead running vehicle 2 to stand by in a curve section. In this example, the comb tooth mark 28 is provided only in curve sections. The ID is located in front of (upstream of) the comb tooth mark 28. For a curve section, the running distance determined on the basis of the comb tooth mark 28 is corrected using the ratio of the radius of curvature of the running rail center line 45 to the radius of curvature of the comb tooth mark 28. In the curve section, an article unloaded onto the station is slightly inclined. If this poses a problem, for example, the overhead running vehicle 2 or station 62 may be provided with a rotational moving mechanism that changes the direction of the article or a mechanism that corrects the direction of the article. If the station 62 cannot be provided in the curve section, then it is necessary to use, for example, an L-shaped conveyor such as the station 63 shown by a chain line in FIG. 6. Such a conveyor requires a high installation cost and generally operates at low speeds.

Figure 7:
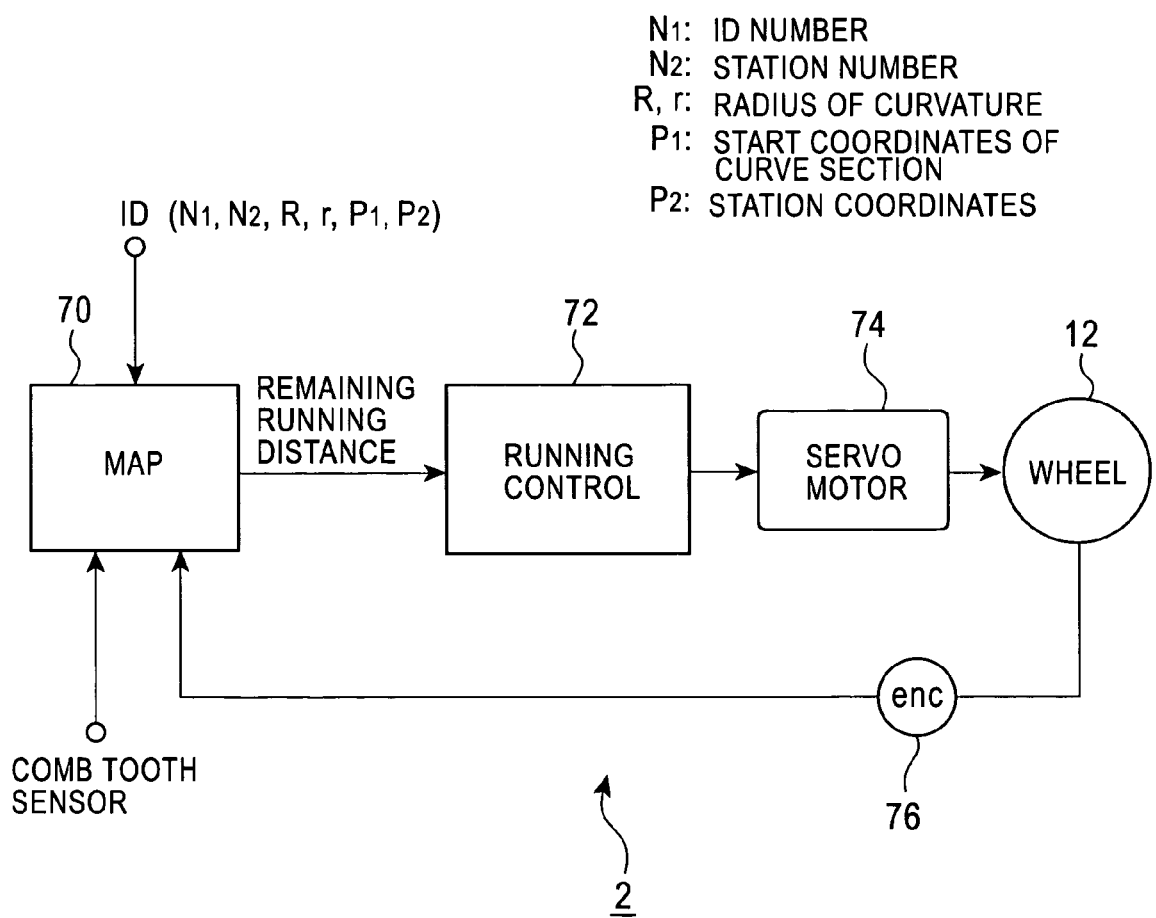
FIG. 7 is a block diagram showing a running control system for the carriage according to the embodiment.

FIG. 7 shows a running control system for the overhead running vehicle 2. 70 is a map that describes the layout of the running rail 4. Upon detecting an ID, the overhead running vehicle 2 inputs the number of the ID and the number of the station to the map 70, and if it is located in a curve section, also inputs the radii of curvature (R), (r) and the start position of the curve section (the position at which the comb tooth mark 28 starts). The overhead running vehicle 2 also inputs the position of the station to the map 70. If the comb tooth mark 28 is provided all over the length of the running route, the running control system always precisely determines the present position of the overhead running vehicle 2 by determining the present position on the basis of the comb tooth mark 28 when the overhead running vehicle 2 is located in a rectilinear section and using the ratio of the radii of curvature to correct the running distance determined on the basis of the comb tooth mark 28 when the overhead running vehicle 2 is located in a curve section. The running control system then performs stop control so that the overhead running vehicle 2 is stopped at the station, on the basis of the current position determined.

The comb tooth mark 28 is provided only in limited sections such as curve sections. If for example, the overhead running vehicle 2 is stopped at a station in a curve section, the running control system determines the start position of the curve section on the basis of the ID. The running control system thus determines the running distance to the station. Alternatively, the running control system receives the corrected running distance obtained by using the ratio of the radii of curvature to correct the running distance determined using the comb tooth sensor 34. The running control system then corrects the areas between the comb teeth using a signal from an encoder 76 to determine the present position of the overhead running vehicle 2.

72 is a running control section to which the map 70 inputs the remaining running distance to the station. The running control section 72 then controls the running of the overhead running vehicle 2 so that the overhead running vehicle 2 can be stopped at a stop point. The encoder 76 is attached to the driving wheel 12 or any of the running wheels 14 to provide an input to the map 70. Thus, the map 70 calibrates the present position of the overhead running vehicle 2, for example, at the start position of a curve section to correct the distance determined by the comb tooth sensor 34 using the radii of curvature. The map 70 thus determines the running distance at predetermined intervals, and during each of these intervals, can recognize the present position of the overhead running vehicle 2 on the basis of the signal from the encoder 76. Accordingly, the overhead running vehicle 2 can precisely recognize its own present position even in a curve section to stop the overhead running vehicle 2 at for example, the load port 62, shown in FIG. 6.

In the embodiment, the running distance determined on the basis of the comb tooth mark 28 is corrected using the ratio of the radii of the curvature (R), (r). However, if the radii of the curvature (R), (r) are fixed throughout the layout, the product of the actual pitch of the comb tooth mark 28 and the ratio of the radii of curvature R/r may be stored in order to calculate the distance in a curve section. However, in this case, the same comb tooth mark 28 is used for the sections different from the curves, for example, the rectilinear sections. Thus, the ID is used to notify the overhead running vehicle 2 of a curve section to switch a method of determining the distance on the basis of the comb tooth mark 28.

The invention claimed is:

1. A carriage system comprising:
a comb tooth mark having teeth and grooves where each of the teeth has the same width as that of each of the grooves;
a rectilinear section and a curve section having the comb tooth mark on both sides of a center line of a running route of a carriage wherein the teeth and the grooves being arranged at a constant pitch in the curve section so that the comb tooth mark being concentric with the center line of the running route;
a sensor for detecting the comb tooth mark is provided on both sides of the carriage with respect to the center line of the running route; and
means for detecting that the carriage is in the curve section, and means for, upon detecting that the carriage is in the curve section, correcting signals from said sensor based on a ratio of a radius of curvature of the center line of the running route to a radius of curvature of the comb tooth mark to determine a running distance in the curve section.

2. The carriage system according to claim 1, further comprising:
a stop point in the curve section, and an encoder for interpolating areas between the teeth of the comb tooth mark to determine the corrected position of the carriage, the carriage being stopped at the stop point.

3. A carriage system comprising:
a running route having a straight section and a curve section;
a comb tooth mark provided on a right side or a left side of a center line of the running route in both said straight and curve sections;
a comb tooth mark detecting sensor on a carriage for reading the comb tooth mark, and
means for determining that the carriage is in the curve section, and means for, upon determining that the carriage is in the curve section, correcting signals from said comb tooth mark detecting sensor based on a ratio of a radius of curvature of the center line of the running route to a radius of curvature of the comb tooth mark to determine a running distance in the curve section.

4. A system that allows a carriage to run along a running route comprising:
a rectilinear section, a curve section, and at least a branching portion, the rectilinear, section, the curve section, and the branching portion being provided with teeth and grooves on both right and left sides of a center line of the running route so that each of the teeth has the same width as that of each of the grooves;
a comb tooth mark having the teeth and the grooves being arranged at a constant pitch in the curve section so that the comb tooth mark is provided concentrically with the center line of the running route;
a sensor for detection of the comb tooth mark is provided on both the right and the left sides of the carriage with respect to the center line of the running route,
wherein the carriage includes means for detecting that the carriage is in the curve section, and means for, upon detecting that the carriage is in the curve section, correcting signals from said sensors based on a ratio of a radius of curvature of the center line of the running route to a radius of curvature of the comb tooth mark to determine a running distance in the curve section.

5. The carriage system according to claim 4, further comprising:
a stop point provided in the curve section; and
an encoder provided in a running system of the carriage which interpolates the running distance in the curve section determined based on said comb tooth mark and determines a position of the carriage so that the carriage is stopped at said stop point.

* * * * *